US006646472B1

(12) United States Patent
Trivedi et al.

(10) Patent No.: US 6,646,472 B1
(45) Date of Patent: Nov. 11, 2003

(54) CLOCK POWER REDUCTION TECHNIQUE USING MULTI-LEVEL VOLTAGE INPUT CLOCK DRIVER

(75) Inventors: Pradeep Trivedi, Sunnyvale, CA (US); Sudhakar Bobba, Sunnyvale, CA (US)

(73) Assignee: Sun Microsystems, Inc., Santa Clara, CA (US)

( * ) Notice: Subject to any disclaimer, the term of this patent is extended or adjusted under 35 U.S.C. 154(b) by 0 days.

(21) Appl. No.: 10/156,249

(22) Filed: May 28, 2002

(51) Int. Cl.[7] .............................................. H03K 19/00
(52) U.S. Cl. .............................. 326/93; 326/95; 326/98; 326/81; 326/83; 326/17; 326/121; 326/119
(58) Field of Search .............................. 326/93, 95, 98, 326/81, 83, 87, 119, 121; 327/208–212, 214, 215, 224, 225

(56) References Cited

U.S. PATENT DOCUMENTS

| | | | |
|---|---|---|---|
| 5,583,457 A | * 12/1996 | Horiguchi et al. | 326/121 |
| 6,489,809 B2 | * 12/2002 | Kiehl | 326/83 |
| 2002/0190752 A1 | * 12/2002 | Takahashi et al. | 326/81 |

* cited by examiner

Primary Examiner—Vibol Tan
(74) Attorney, Agent, or Firm—Rosenthal & Osha L.L.P.

(57) ABSTRACT

A technique for reducing the power consumed by a clock driver circuit involves selecting between a first power supply path and a second power supply path in response to a power reduction signal. A driver circuit drives an output clock signal from the selected one of the first power supply path and the second power supply path. By reducing the voltage on one of the first power supply path and the second power supply path, the power consumed by the clock driver circuit may be selectively reduced.

20 Claims, 5 Drawing Sheets

CLOCK POWER REDUCTION TECHNIQUE USING MULTI-LEVEL VOLTAGE INPUT CLOCK DRIVER

BACKGROUND OF INVENTION

Modern high performance microprocessors have an ever-increasing number of circuit elements and an ever-rising clock frequency. Also, as the number of circuits that can be used in a central processing unit (CPU) has increased, the number of parallel operations has risen. As CPU performance continues to increase, the result has been a larger number of circuits switching at faster rates.

Higher frequencies and data throughput cause a processor to consume increased power. The power dissipated by a circuit is a quadratic function of the supply voltage. Reducing the supply voltage may decrease the power dissipated by a circuit; however, reducing the supply voltage also increases the delay of the circuit. Slowing the speed of the circuit may cause some CPU activities to be incomplete at the end of a cycle. The effect may lead to loss of data in a CPU or incorrect results. Thus, from a design perspective, power is an important consideration. Power is a consideration in the design of a broad range of integrated circuits, including CPUs.

As shown in FIG. 1, a typical computer system (10) has, among other components, a microprocessor (12), one or more forms of memory (14), integrated circuits (16) having specific functionalities, and peripheral computer resources (not shown), e.g., monitor, keyboard, software programs, etc. These components communicate with one another via communication paths (19), e.g., wires, buses, etc., to accomplish the various tasks of the computer system (10).

In order to properly accomplish such tasks, the computer system (10) relies on the basis of time to coordinate its various operations. To that end, a crystal oscillator (18) generates a system clock signal (referred to and known in the art as "reference clock signal" and shown in FIG. 1 as SYS_CLK) to various parts of the computer system (10). Modern microprocessors and other integrated circuits, however, are typically capable of operating at frequencies significantly higher than the system clock signal, and thus, it becomes important to ensure that operations involving the microprocessor (12) and the other components of the computer system (10) use a proper and accurate reference of time.

One component used within the computer system (10) to ensure a proper reference of time among a system clock signal and a microprocessor clock signal, i.e., "chip clock signal," is a type of clock generator known as a phase locked loop, or "PLL" (20). The PLL (20) is an electronic circuit that controls an oscillator such that the oscillator maintains a constant phase relative to a system clock signal. Referring to FIG. 1, the PLL (20) has as its input the system clock signal, which is its reference clock signal, and outputs a chip clock signal (shown in FIG. 1 as CHIP_CLK) to the microprocessor (12). The system clock signal and chip clock signal have a specific phase and frequency relationship controlled by the PLL (20). This relationship between the phases and frequencies of the system clock signal and chip clock signal ensures that the various components within the microprocessor (12) use a controlled and accounted for reference of time.

A significant portion of the power consumed by a CPU occurs from the activities of generating and propagating the chip clock signal to various circuits on the CPU. When a CPU pipeline stalls, the chip clock signal continues to consume power regardless of the lack of processing. For example, a memory miss on the on-chip cache creates a situation in which the CPU may stall while the required information is fetched from off-chip memory or storage. During the stall, the chip clock signal continues to run even though no processing is performed with the circuits that are stalled. The chip clock signal operation is a significant portion of the power consumed during a pipeline stall.

FIG. 2 shows a representative PLL (200). The PLL (200) includes a PLL core (202) and a clock signal distribution network (220). The PLL core (202) generates the CHIP_CLK (203) signal based on a SYS_CLK (201) signal, any multiplication factor programmed in the PLL core (202), and a feedback loop signal (211).

The clock signal distribution network (220) includes multiple inverters (204). The clock signal distribution network (220) supplies a copy of the CHIP_CLK (203) signal to a variety of different circuits (not shown) on an integrated circuit. The different circuits may receive a copy of the CHIP_CLK (203) signal from signals (205, 207, 209) and from feedback loop signal (211) in the clock signal distribution network (220). The multiple inverters (204) may be located at physically distant locations from each other. The multiple inverters (204) buffer the CHIP_CLK (203) signal so that transition edges of each copy of the CHIP_CLK (203) signal at each signal (205, 207, 209) and feedback loop signal (211) occurs within a specified time duration. The multiple inverters (204) allow the capacitive load created by the variety of different circuits (not shown) connected to the signals (205, 207, 209) and feedback loop signal (211) to be properly driven.

The feedback loop signal (211) provides a mechanism for the PLL core (202) to adjust for any errors in the PLL output, CHIP_CLK (203) signal. The feedback loop signal (211) is a delayed copy of the CHIP_CLK (203) signal. The feedback loop signal (211) provides a clock signal that must stay in synchronization with the system clock signal, SYS_CLK (201).

The PLL core (202) aligns the transition edge and frequency of the SYS_CLK (201) signal and the feedback loop signal (211). The PLL core (202) adjusts its output frequency in order to zero any phase and frequency difference between the SYS_CLK (201) signal and the feedback loop signal (211). The PLL core (202) may include a multiply-by-N block to generate the CHIP_CLK (203) signal at N times the frequency of the SYS_CLK (201) signal. Multiplying the SYS_CLK (201) signal is useful when the CHIP_CLK (203) signal must have a higher frequency than the SYS_CLK (201) signal. By adding a divide by N block to the feedback loop signal (211) input to the PLL core (202), the feedback clock signal (211) frequency should be divided by N times to allow the phase and frequency difference between the SYS_CLK (201) signal and the feedback loop signal (211) to zero.

Higher frequencies and data throughput cause a processor to consume increased power. The power dissipated by a circuit is a quadratic function of the supply voltage. In particular, power is equal to the capacitance of the load multiplied by the frequency of switching multiplied by the square of the supply voltage. That is, $P=C_{LOAD} \, fV_{DD}^2$, where P is power, $C_{LOAD}$ is the capacitance of the load, f is frequency, and $V_{DD}$ is the supply voltage. Reducing the supply voltage may reduce the power dissipated; however, reducing the supply voltage also increases the delay of a circuit. For example, power consumed by the inverters (204)

may be reduced by reducing the supply voltage. Reducing the supply voltage may decrease the power dissipated by the inverters (204); however, reducing the supply voltage also increases the delay of the inverters (204). Slowing the speed of the circuit may cause some CPU activities to be incomplete at the end of a cycle.

In FIG. 2, the clock distribution network (220) may be connected to a voltage regulator circuit. The voltage regulator circuit provides a means to reduce the supply voltage. Reducing the supply voltage of a voltage regulator circuit, however, may take hundreds, if not thousands, of clock cycles to adjust to a new supply voltage.

SUMMARY OF INVENTION

According to one aspect of the present invention, an integrated circuit comprises a first power supply path leading to a first voltage; a second power supply path leading to a second voltage; a power reduction signal to enable a reduction in power on the integrated circuit; and a clock driver circuit including a clock path for carrying an output clock signal out of the clock driver circuit, a selection circuit coupled to the clock path where the selection circuit selects one of the first power supply path and the second power supply path based on the power reduction signal, and a drive circuit operatively coupled to the clock path where the drive circuit drives the output clock signal on the clock path from the selected one of the first power supply path and the second power supply path.

According to one aspect of the present invention, a method for reducing power on an integrated circuit comprises selectively switching between a first voltage and a second voltage based on a power reduction signal, and driving an output clock signal from the selectively switched one of the first and second According to one aspect of the present invention, an integrated circuit comprises means for selectively switching between a first voltage and a second voltage based on a power reduction signal, and means for driving an output clock signal from the selected one of the first and second voltages.

Other aspects and advantages of the invention will be apparent from the following description and the appended claims.

DETAILED DESCRIPTION

Embodiments of the present invention relate to a clock driver circuit arranged to receive an input clock signal and drive an output clock signal. The clock driver circuit includes a selection circuit to select between a first power supply path and a second power supply path. A power reduction signal indicates which of the first power supply path and the second power supply path should be used to drive the output clock signal. If the second power supply path is selected and the second power supply path has a reduced voltage compared to the first power supply path, the power consumed while driving the output clock signal will be reduced. Furthermore, the power reduction signal will indicate to the PLL core to reduce the clock frequency of the chip clock signal. The reduced chip clock signal frequency enables the clock distribution network to operate with the additional delay created by the reduced supply voltage. The clock driver circuit may switch between using the first power supply path and the second power supply path within a single clock cycle.

Figure 1:
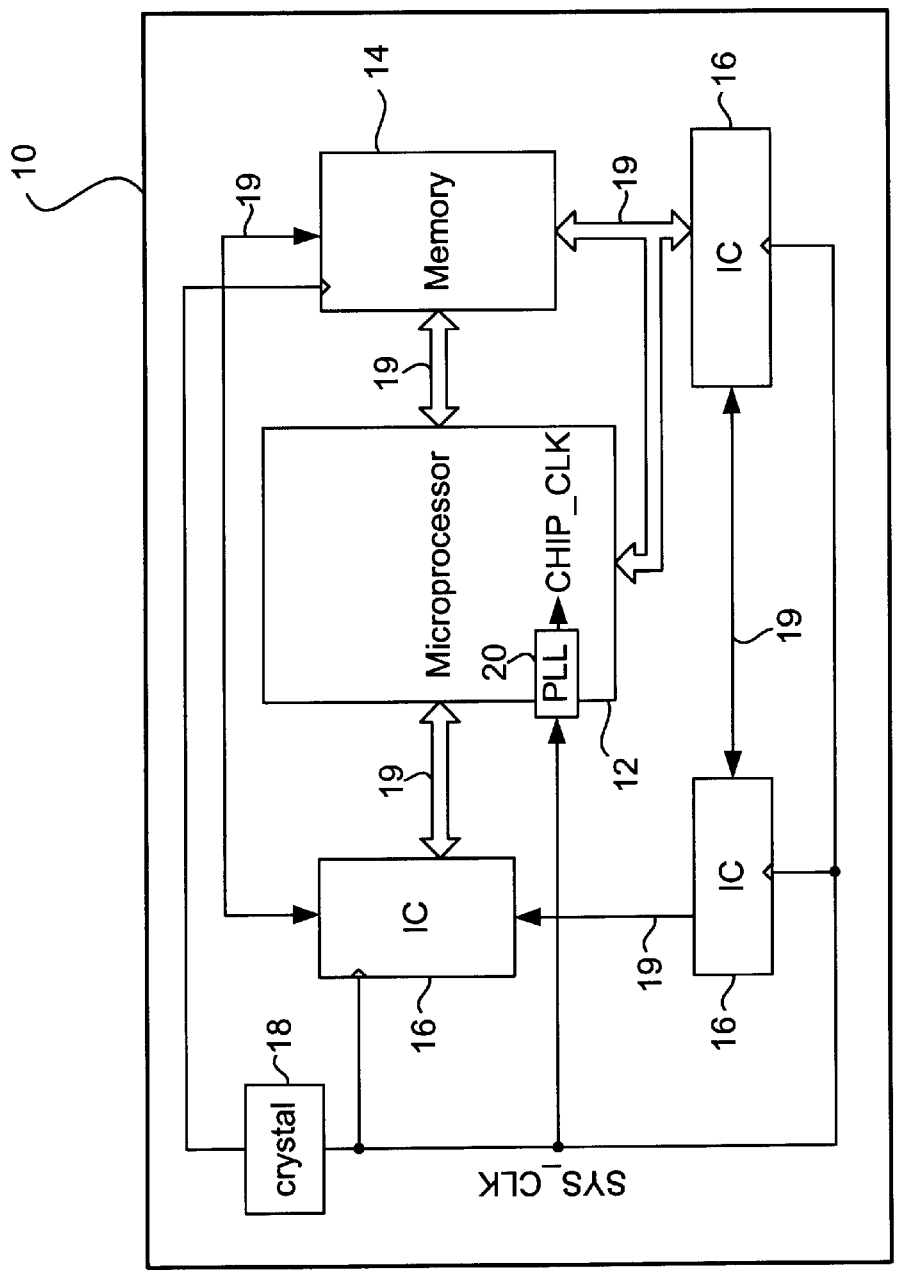
FIG. 1 shows a prior art depiction of an integrated circuit.
Figure 2:
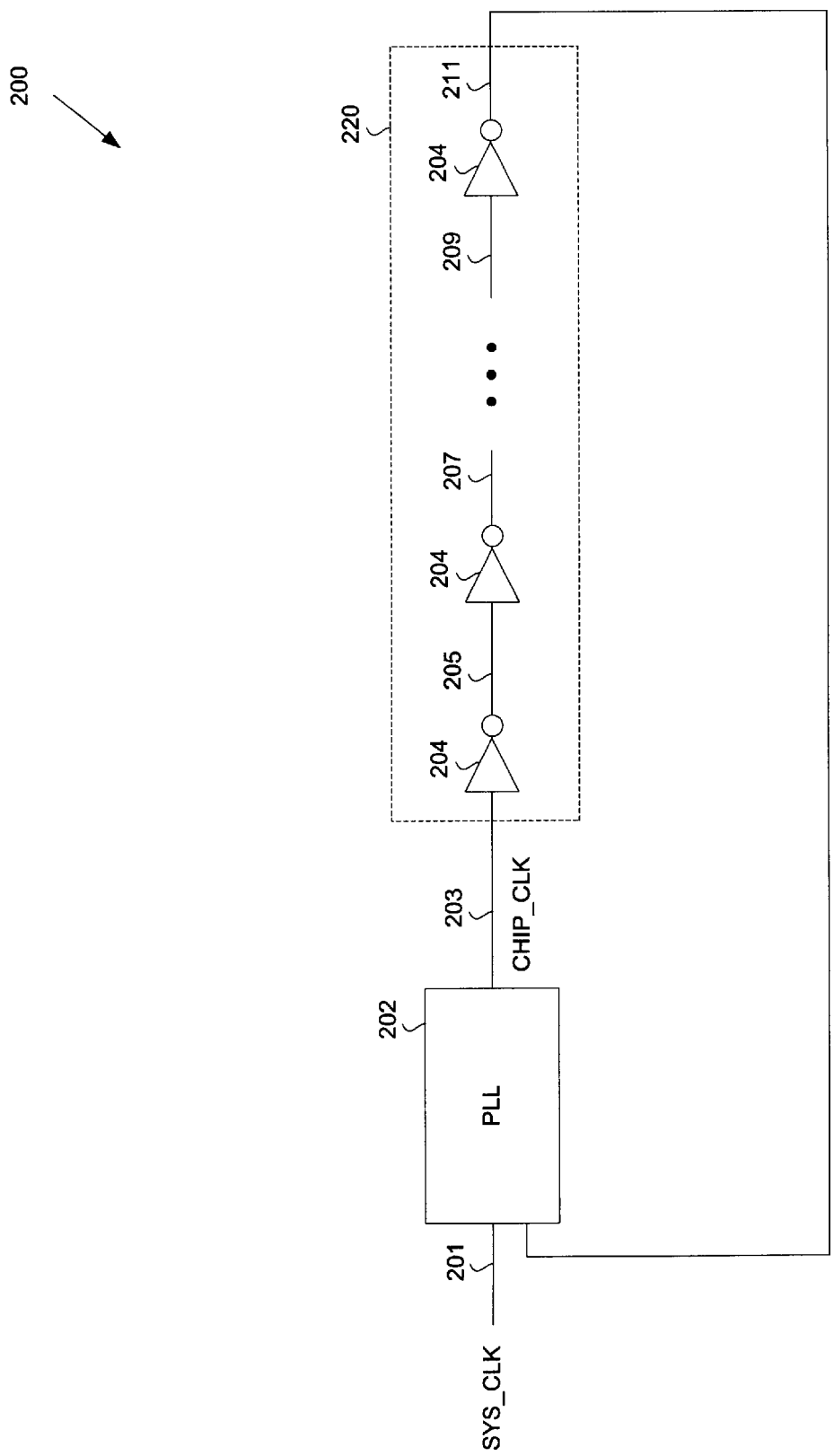
FIG. 2 shows a schematic of a phase locked loop and clock distribution network.
Figure 3:
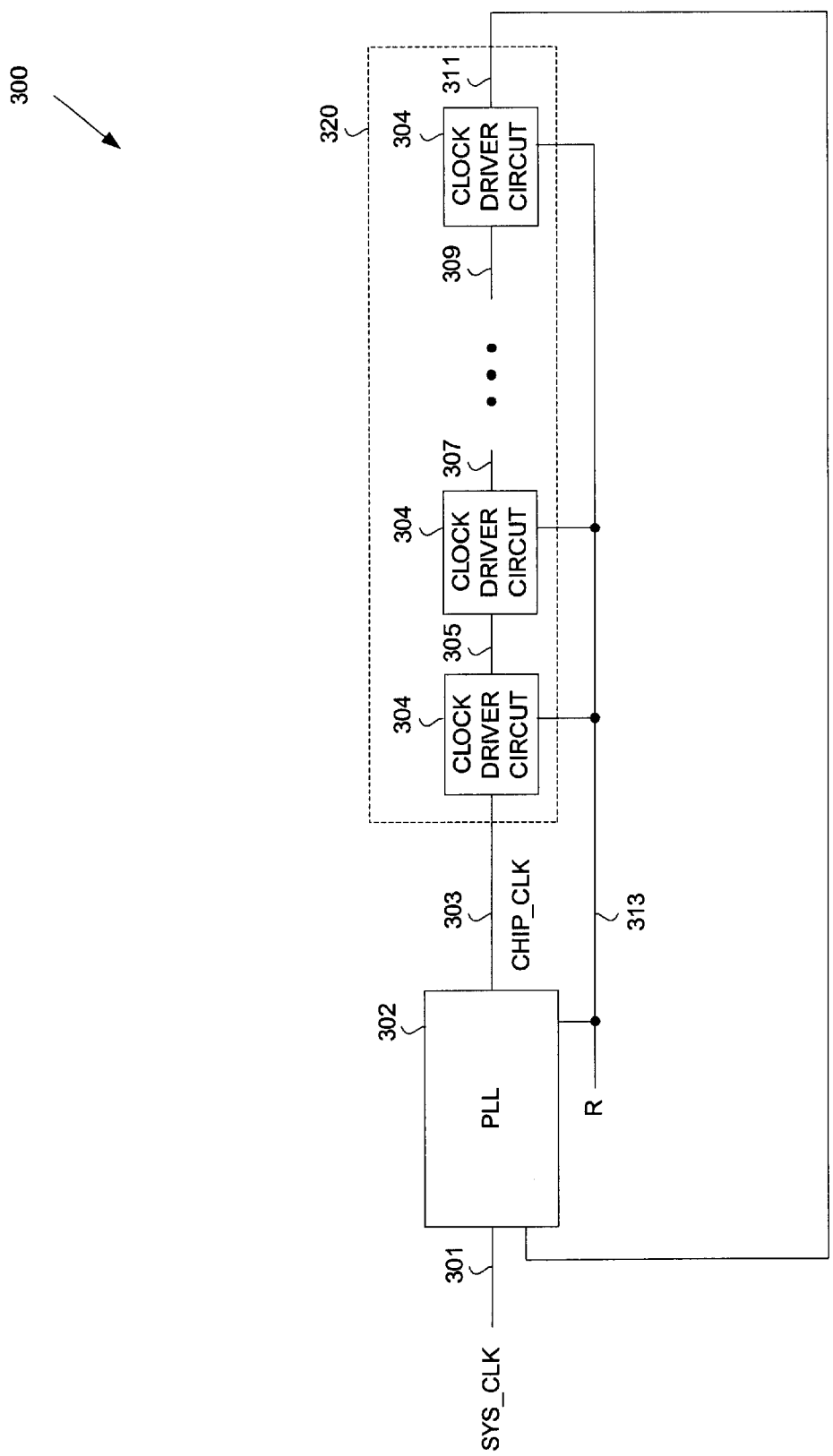
FIG. 3 shows a schematic of a phase locked loop and multi-level voltage clock distribution network.

FIG. 3 shows a PLL (300) in accordance with an embodiment of the present invention. The PLL (300) includes a PLL core (302) and a multi-level voltage clock signal distribution network (320). The PLL core (302) generates the CHIP_CLK (303) signal based on a SYS_CLK (301) signal, any multiplication factor programmed in the PLL core (302), and a feedback loop signal (311). The PLL core (302) is also able to rapidly switch between the programmed multiplication factor and a reduced frequency based on the state of a power reduction signal, signal R (313).

The clock signal distribution network (320) includes multiple clock driver circuits (304). The clock signal distribution network (320) supplies a copy of the CHIP_CLK (303) signal to a variety of different circuits (not shown) on an integrated circuit. The different circuits may receive a copy of the CHIP_CLK (303) signal from signals (305, 307, 309) and from feedback loop signal (311) in the clock signal distribution network (320). The multiple clock driver circuits (304) may be located at physically distant locations from each other. The multiple clock driver circuits (304) buffer the CHIP_CLK (303) signal so that transition edges of each copy of the CHIP_CLK (303) signal at each signal (305, 307, 309) and feedback loop signal (311) occurs within a specified time duration. The multiple clock driver circuits (304) allow the capacitive load created by the variety of different circuits (not shown) connected to the signals (305, 307, 309) and feedback loop signal (311) to be properly driven.

The clock driver circuits (304) also respond to the power reduction signal, signal R (313), and its complement, signal R_(not shown). When signal R (313) is "high" and signal R_is "low," the signals (305, 307, 309) and feedback loop signal (311) transition between a reduced voltage difference compared to when signal R (313) is "low" and signal R_(323) is "high."

The feedback loop signal (311) provides a mechanism for the PLL core (302) to adjust for any errors in the PLL output, CHIP_CLK (303) signal. The feedback loop signal (311) is a delayed copy of the CHIP_CLK (303) signal. The feedback loop signal (311) provides a clock signal that must stay in synchronization with the system clock signal SYS_CLK (301) signal.

The PLL core (302) aligns the transition edge and frequency of the SYS_CLK (301) signal and the feedback loop signal (311). The PLL core (302) adjusts its output frequency in order to zero any phase and frequency difference between the SYS_CLK (301) signal and the feedback loop signal (311). The PLL core (302) may include a multiply-by-N block to generate the CHIP_CLK (303) signal at N times the frequency of the SYS_CLK (301) signal. Multiplying the SYS_CLK (301) signal is useful when the CHIP_CLK (303) signal must have a higher frequency than the SYS_CLK (301) signal. By adding a divide-by-N block to the feedback loop signal (311) input to the PLL core (302), the feedback clock signal (311) frequency should be divided by N times to allow the phase and frequency difference between the SYS_CLK (301) signal and the feedback loop The PLL core (302) also responds to the power reduction signal, signal R (313). When signal R (313) is "high" (and signal R_(323) is "low"), the PLL core (302) reduces the CHIP_CLK (305) signal frequency. The PLL core (302) typically contains divider circuits associated with the SYS_CLK (301) signal, feedback loop signal (311), and CHIP_CLK (303) signal. The divider circuits allow the PLL core (302) to reduce the CHIP_CLK (303) signal within a few clock cycles while still maintaining a lock on the phase and frequency difference between the SYS_CLK (301) signal and the feedback loop signal (311).

Higher frequencies and data throughput cause a processor to consume increased power. The power dissipated by a circuit is a quadratic function of the supply voltage. In particular, power is equal to the capacitance of the load multiplied by the frequency of switching multiplied by the square of the supply voltage. That is, $P = C_{LOAD} f V_{DD}^2$, where P is power, $C_{LOAD}$ is the capacitance of the load, f is frequency, and $V_{DD}$ is the supply voltage. Reducing the supply voltage and the clock frequency reduces the power dissipated.

For example, the power consumed by the clock driver circuits (304) may be reduced by operating with a reduced the supply voltage. Reducing the supply voltage may decrease the power dissipated by the clock driver circuits (304); however, reducing the supply voltage also increases the delay of the clock driver circuits (304). The increased delay created by the clock driver circuits (304) is compensated by reducing the CHIP_CLK (305) signal frequency. Slowing the frequency of the CHIP_CLK (305) signal decreases processing throughput; however, the power reduction signal, signal R (313), is only engaged during CPU stalls or period of inactivity to conserve power.

Figure 4:
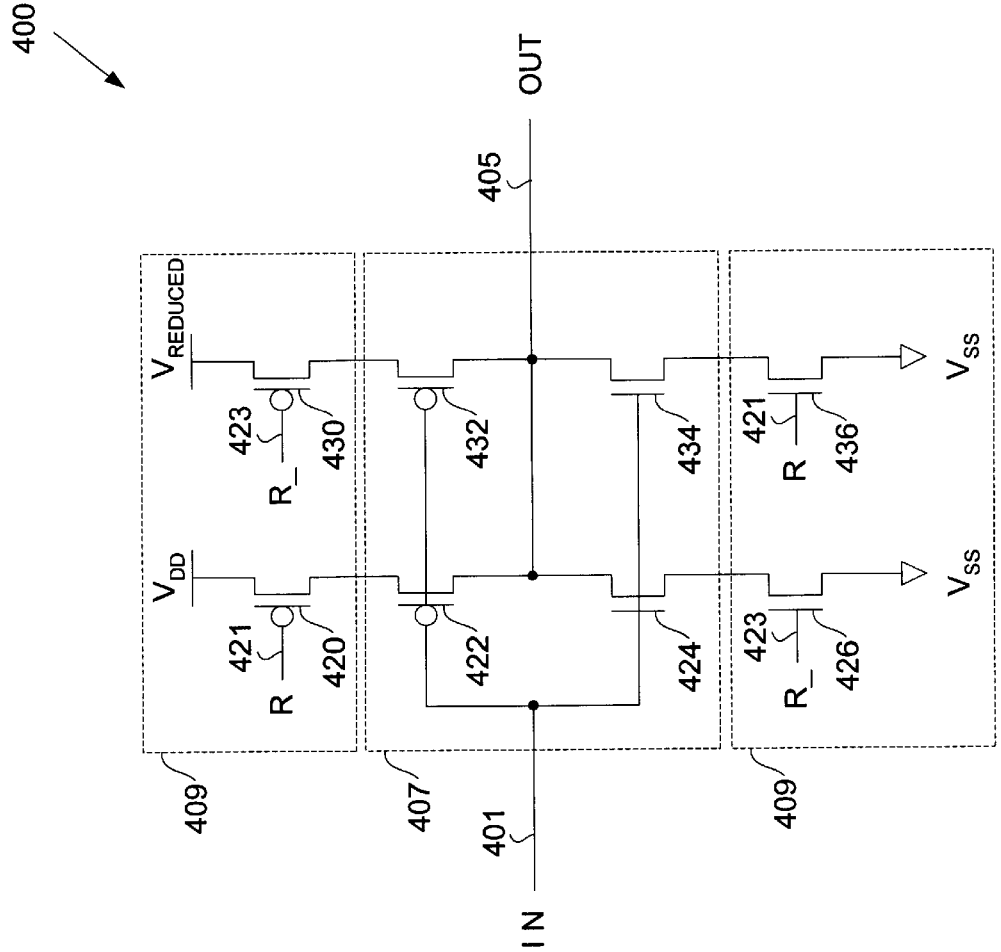
FIG. 4 shows a schematic of a multi-level voltage clock driver circuit in accordance with an embodiment of the present invention.

FIG. 4 shows an exemplary clock driver circuit (400) in accordance with an embodiment of the present invention. The clock driver circuit (400) is capable of driving a load at a reduced power consumption level. The clock driver circuit (400) may be representative of the clock driver circuits (304) shown in FIG. 3. As can be seen in FIG. 4, the clock driver circuit (400) includes transistors (420, 422, 424, 426, 430, 432, 434, and 436). The clock driver circuit (400) includes a driver circuit (407) and a selection circuit (409). The selection circuit (409) provide a multi-level voltage to the driver circuit (407) depending on a power reduction signal, signal R (421), and its complement, signal R_(423).

The driver circuit (407) includes p-channel transistors (422, 432) and n-channel transistors (424, 434). Depending on the state of the input clock signal, IN (401), either the p-channel transistors (422, 432) or n-channel transistors (424, 434) are "on." If the input clock signal (401) is "high," the n-channel transistors (424, 434) are "on." If the input clock signal (401) is "low," the p-channel transistors (422, 432) are "on." The voltage level of the output clock signal, OUT (405), depends on the state of a power reduction signal, signal R (421) and its complement, signal R_(423).

The selection circuit (409) includes p-channel transistors (420, 430) and n-channel transistors (426, 436). If signal R (421) is "low" (therefore its complement, signal R_(323), is "high"), p-channel transistor (420) and n-channel transistor (426) are "on," and p-channel transistor (430) and n-channel transistor (436) are "off." I this case, the output clock signal (405) transitions between the positive supply voltage $V_{DD}$ and the ground supply voltage $V_{SS}$.

Alternately, if signal R (421) is "high" (and, accordingly, its complement, signal R_(423), is "low"), p-channel transistor (420) and n-channel transistor (426) are "off", and p-channel transistor (430) and n-channel transistor (436) are "on." The output clock signal (405) will transition between the positive supply voltage $V_{REDUCED}$ and the ground supply voltage $V_{SS}$. Because, $V_{DD}$ has a greater voltage than $V_{REDUCED}$, the power consumed to drive the output clock signal (405) is decreased.

In FIG. 4, both the positive supply voltage $V_{DD}$ and positive supply voltage $V_{REDUCED}$ may be supplied by external supply voltage sources. Furthermore, either the positive supply voltage $V_{DD}$ or positive supply voltage $V_{REDUCED}$, or both, may be supplied by a regulator circuit. The selection circuit (409) may select between the positive supply voltage $V_{DD}$ and positive supply voltage $V_{REDUCED}$ within one clock cycle.

In an alternate arrangement, the input clock signal (403) may connect to transistors (420, 430, 426, and 436), while the signal R (421) connects to transistors (422, 434) and signal R_(423) connects to transistors (424, 432). This alternate arrangement, versus the arrangement previously described, may reduce a load on the input clock signal (401), signal R (421), and/or signal R_(423).

The transistors (430, 432, 434, and 436) may be different sizes than transistors (420, 422, 424, 426). The size differences may be used to tune the edge transition rate of the output clock signal (403) when the supply voltage is reduced. The edge transition rate refers to the amount of time necessary for a signal to transition from a "low" to a "high" voltage or vice versa. The change in state of signal R (421) and its complement, signal R_(423), produces a change in voltage on the output clock signal (405) within one clock cycle whether the signal R changes from a "high" or a "low" state.

When the positive supply voltage $V_{REDUCED}$ is used in the clock driver circuit (400), the delay from the input clock signal (401) to the output clock signal (405) is increased. Because the clock driver circuit (400) may use the positive supply voltage $V_{REDUCED}$, the output clock signal (405) may not maintain a usable copy of the input clock signal (401). The input clock signal (401) frequency may be reduced at the output clock signal (405) due to the delay. The reduction may result in the output clock signal (405) having an amplitude that is lower than the positive supply voltage $V_{REDUCED}$. The amplitude may be reduced to a level in which the next clock driver circuit (400) does not respond to its input clock signal (401). The PLL core (302) in FIG. 3 is modified to add the power reduction signal, signal R (321) in FIG. 3, to reduce the frequency of the CHIP_CLK (303) signal in FIG. 3. The frequency reduction of the CHIP_CLK (303) signal allows the clock distribution network (320) in FIG. 3 to continue to operate properly.

One of ordinary skill in the art will appreciate that the equation for power includes the square of the voltage term; therefore, a small reduction in voltage between $V_{DD}$ and $V_{REDUCED}$ may provide a substantial reduction in power. As an alternative to using the PLL core (302) in FIG. 3, the input clock signal (401) may be provided by a delay locked loop or a clock supplied to the integrated circuit on which the clock driver circuit (400) resides.

The clock driver circuit described in FIG. 4 provides a reduced voltage on the output clock signal (405) when signal R (421) is "high." The clock driver circuit (400) consumes less power, but may increase the delay through the clock driver circuit (400). Because the integrated circuit is in a particular mode, e.g., a pipeline stall, that does not require an undelayed CHIP_CLK (303) signal in FIG. 3 or an undelayed copy of the CHIP_CLK (303) signal from the signals (305, 307, 309) and feedback loop signal (311) in FIG. 3, the operation of the integrated circuit is not affected.

Figure 5:
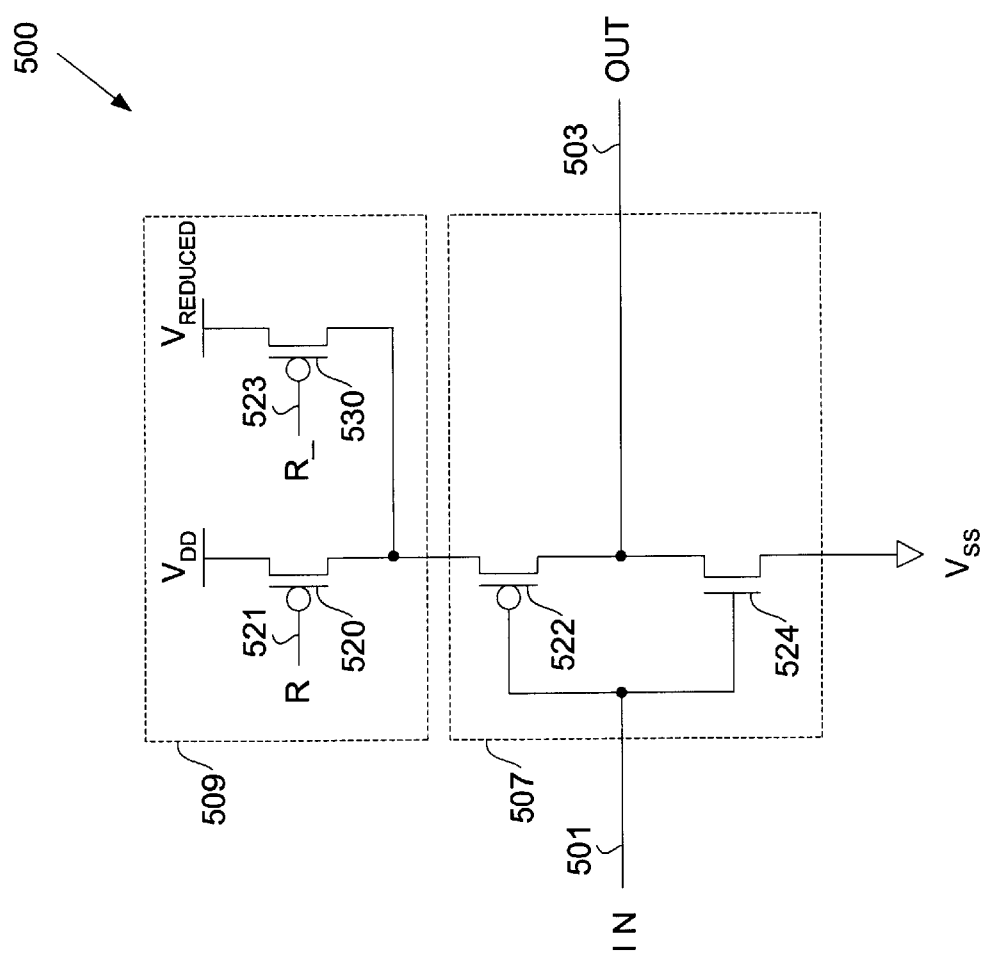
FIG. 5 shows a schematic of a multi-level voltage clock driver circuit in accordance with an embodiment of the present invention.

FIG. 5 shows an exemplary clock driver circuit (500) to drive a load with reduced power in accordance with an embodiment of the present invention. As can be seen in FIG. 5, a clock driver circuit (500) includes transistors (520, 522, 524, and 530). The clock driver circuit includes a driver circuit (507) and a selection circuit (509). The selection circuit (509) provide a multi-level voltage to the driver circuit (507) depending on a power reduction signal, signal R (521), and its complement, signal R_(523).

The driver circuit (507) includes p-channel transistor (522) and n-channel transistor (524). Depending on the state of the input clock signal, IN (501), either the p-channel transistor (522) or n-channel transistor (524) are "on." When the input clock signal (503) is "high," the n-channel transistor (524) is "on." When the input clock signal (503) is "low," the p-channel transistor (522) is "on." The voltage level of the output clock signal, OUT (505), depends on the state of signal R (521) and its complement, signal R_(523).

The selection circuit (509) includes p-channel transistors (520 and 530). When signal R (521) is "low" (and, accordingly, its complement, signal R_(523), is "high"), p-channel transistor (526) is "on," and p-channel transistor (530) is "off." In this case, the chip clock (505) transitions between the positive power supply voltage $V_{DD}$ and the ground power supply $V_{SS}$. When signal R (521) is "high" (therefore its complement, signal R_(523), is "low"), p-channel transistor (520) is "off," and p-channel transistor (530) is "on." In this case, the chip clock (505) transitions between the positive power supply voltage $V_{REDUCED}$ and the ground power supply $V_{SS}$. If $V_{DD}$ has a greater voltage than $V_{REDUCED}$, the power consumed to drive the output clock signal (505) is decreased.

One of ordinary skill in the art will appreciate that the equation for power includes the square of the voltage term; therefore, a small reduction in voltage between $V_{DD}$ and $V_{REDUCED}$ may provide a substantial reduction in power. Because the clock driver circuit (500) may accept any clock signal as an input, the input clock signal may be provided by a delay locked loop or from a clock supplied to the integrated circuit on which the clock driver circuit resides.

The p-channel transistor (520) may have a different size than the p-channel transistor (530). The size difference may be used to tune the edge transition rate of the output clock signal (503) when the supply voltage is reduced. The edge transition rate refers to the amount of time necessary for a signal to transition from a "low" to a "high" voltage or vice versa. The change in state of signal R (521) and its complement, signal R_(523), produces a change in voltage on the output clock signal (503) within one clock cycle whether the signal R changes from a "high" or a "low" state.

Advantages of the present invention may include one or more of the following. In one or more embodiments, because a voltage used by a clock driver circuit is reduced while a clock signal is driven, the power consumed by the clock driver circuit is reduced. A power reduction signal determines when a power reduction occurs; therefore, the power reduction may occur at times when the integrated circuit is in a particular mode. The mode in which the power reduction occurs may be less susceptible to characteristics of the clock signal that are not generally present when not in this power reduction mode. The entry and exit from the power reduction mode may occur within one clock cycle.

In one or more embodiments, because a clock driver circuit may be designed with transistors of different sizes, a load on either an input clock signal, power reduction signal, or both, may be reduced. In some embodiments, an edge transition rate of an output clock signal is able to be tuned using the size differences of the transistors.

In one or more embodiments, a clock driver circuit is responsive to a phase locked loop, a delay locked loop, or an input clock signal supplied to the integrated circuit.

While the invention has been described with respect to a limited number of embodiments, those skilled in the art, having benefit of this disclosure, will appreciate that other embodiments can be devised which do not depart from the scope of the invention as disclosed herein. Accordingly, the scope of the invention should be limited only by the attached claims.

What is claimed is:

1. An integrated circuit, comprising:
   a first power supply path leading to a first voltage;
   a second power supply path leading to a second voltages, wherein the first voltage is greater than the second voltage;
   a power reduction signal to enable a reduction in power consumption on the integrated circuit; and
   a clock driver circuit, comprising:
      a clock path for carrying an output clock signal from the clock driver circuit,
      a selection circuit coupled to the clock path, wherein the selection circuit selects one of the first power supply path and the second power supply path based on the power reduction signal, and
      a drive circuit operatively coupled to the clock path, wherein the drive circuit drives the output clock signal on the clock path from the selected one of the first power supply path and the second power supply path.

2. The integrated circuit of claim 1, wherein the clock driver circuit receives an input clock signal supplied to the integrated circuit.

3. The integrated circuit of claim 1, wherein the clock driver circuit receives an input clock signal from a phase locked loop.

4. The integrated circuit of claim 3, wherein the phase locked loop reduces its output frequency in response to the power reduction signal.

5. The integrated circuit of claim 1, wherein the clock driver circuit receives an input clock signal from a delay locked loop.

6. The integrated circuit of claim 1, wherein the clock driver circuit, in response to a change in state of the power reduction signal, changes within one clock cycle from selecting the first power supply path to selecting the second power supply path to drive the output clock signal.

7. The integrated circuit of claim 1, wherein the clock driver circuit, in response to a change in state of the power reduction signal, changes within one clock cycle from selecting the second power supply path to selecting the first power supply path to drive the output clock signal.

8. The integrated circuit of claim 1, wherein the selection circuit comprises a first selection transistor operatively coupled to the first power supply path and a second selection transistor operatively coupled to the second power supply path.

9. The integrated circuit of claim 8, wherein the first selection transistor has a different size than the second selection transistor.

10. The integrated circuit of claim 1, wherein the second voltage is generated external to the integrated circuit.

11. The integrated circuit of claim 1, wherein the second voltage is generated by a voltage regulator on the integrated circuit.

12. A method for reducing power on an integrated circuit, comprising:

receiving a power reduction signal;

selectively switching between a first voltage and a second voltage based on the power reduction signal, wherein the first voltage is greater than the second voltage; and driving an output clock signal from the selectively switched one of the first and second voltages.

13. The method of claim 12, wherein the driving of the output clock signal is responsive to an input clock signal supplied to the integrated circuit.

14. The method of claim 12, wherein the driving of the output clock signal is responsive to an input clock signal supplied by a phase locked loop.

15. The method of claim 12, wherein the driving of the output clock signal is responsive to an input clock signal supplied by a delay locked loop.

16. The method of claim 12, wherein the selectively switching occurs within one clock cycle.

17. The method of claim 12, wherein the selectively switching comprises:

selectively providing a second voltage to the output clock signal in response to an enabling of the power reduction signal; and selectively providing a first voltage to the output clock signal in response to a disabling of the power reduction signal.

18. The method of claim 17, wherein upon a change in state of the power reduction signal, the selectively providing of the first voltage and second voltage.

19. An integrated circuit, comprising:

means for receiving a power reduction signal;

means for selectively switching between a first voltage and a second voltage based on the power reduction signal, wherein the first voltage is greater than the second voltage;

means for driving an output clock signal from the selected one of the first and second voltages.

20. The integrated circuit of claim 19, wherein, in response to a change in state of the power reduction signal, the means for selectively switching between the first voltage and the second voltage switches within one clock cycle.

* * * * *

UNITED STATES PATENT AND TRADEMARK OFFICE
CERTIFICATE OF CORRECTION

PATENT NO. : 6,646,472 B1  
DATED : November 11, 2003  
INVENTOR(S) : Pradeep Trivedi et al.

It is certified that error appears in the above-identified patent and that said Letters Patent is hereby corrected as shown below:

<u>Column 8,</u>  
Line 21, please replace "voltages" with -- voltage --.

<u>Column 10,</u>  
Line 10, please insert the word -- changes -- after the second occurrence of "voltage".

Signed and Sealed this

Second Day of March, 2004

JON W. DUDAS  
*Acting Director of the United States Patent and Trademark Office*